March 14, 1961    O. SCHÄRLI    2,975,343
SEMICONDUCTOR RECTIFIERS
Filed Nov. 14, 1958
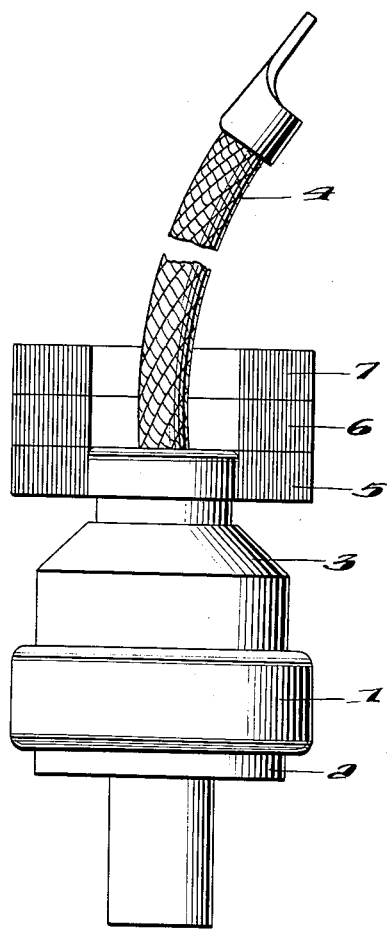
INVENTOR
Otto Schärli,
BY Pierce, Scheffler & Parker
his ATTORNEYS United States Patent Office 2,975,343
Patented Mar. 14, 1961

1

2,975,343
SEMICONDUCTOR RECTIFIERS

Otto Schärli, Baden, Switzerland, assignor to Aktiengesellschaft Brown, Boveri & Cie, Baden, Switzerland, a joint-stock company Filed Nov. 14, 1958, Ser. No. 773,851

Claims priority, application Switzerland Nov. 29, 1957

5 Claims. (Cl. 317—234)

This invention relates to semiconductor rectifiers, i.e., to rectifiers whose rectifying film is located for example in a germanium or silicon body and is more particularly concerned with the elimination of the disadvantageous consequences of the so-called "Hole-Storage-Effect." This known designation refers to the phenomenon that in each case at the beginning of the rectifying period there appears a backward current of short duration. For example, in a typical germanium rectifier it was found that the amplitude of this backward current lies in the order of magnitude of 1% of the average value of the rectified current, and that the duration of the backward current impulse is practically independent of the load of the rectifier and amounts to about 25 micro-seconds. The rear flank of this impulse drops off very steeply, and in combination with the reactance of the electric circuit gives rise to a voltage peak whose height may far exceed the permissible rectifying voltage of the rectifier and which therefore can damage the rectifier to the point of uselessness. This voltage peak is followed by a greatly modulated vibration process. The backward current impulse forms in each case due to the fact that the rectifying voltage which sets in exhausts the minority carriers still present—from the free transmission period—on both sides of the rectifying layer in the heavily doped regions. This effect is inseparably connected with the physical mechanism of rectification; therefore, it cannot fundamentally be eliminated by measures undertaken at the semiconductor rectifier itself.

It is known how to diminish the harmful voltage peaks by connecting a capacity parallel to the semiconductor rectifier. This measure, however, brings with it a deterioration in the efficiency of the rectifier.

The disadvantageous voltage peak can be reduced to about one-tenth of its previous value through the measure according to the invention, without, at the same time, suffering any necessary detrimental effect on the rectifier effect.

A semiconductor rectifier arrangement according to the invention is characterized in that at least at one point of the conductors connected to the rectifier there is arranged a ring member which encloses the conductor, which ring member consists of a material with high initial and maximal permeability with small magnetic field strengths, as well as with small hysteresis losses. It is preferable that a portion of the ring member contactingly surround a portion of the casing of the semi-conductor rectifier. It can, in such case, be structurally united with the casing, so that a separate arrangement of the ring member, upon insertion of the rectifier into the circuit, is not necessary.

The drawing shows an illustrative embodiment of such an arrangement. The semi-conductor body is located in the container 1, consisting for example of glass, which is closed off on the one side by the metal part 2 connected to one electrode of the rectifier, on the other side by the metal part 3, which serves to hold the feed cable 4 connected to the other electrode of the rectifier. In the arrangement of the present invention, a portion 5 of the ring member is arranged around the part 3, thus enclosing the line 4. The ring member preferably consists of a band of suitable material wound upon itself. An alloy of 75% nickel and 25% iron, which is known by the name "Permalloy" has been found to function well. The above-mentioned decrease of the disadvantageous voltage peak to about 1/10 of its previous value has, in practice, been achieved with a material cross section of 4.5 cm.$^2$, for which latter the ring member includes—in addition to portion 5—two additional identical ring portions 6 and 7.

The technical advance achieved by the measure according to the invention resides primarily in that the permissible nominal tension of a given semi-conductor rectifier may be applied to it without any modification, because it is no longer necessary to include a safety margin for the harmful voltage peak.

I claim:

1. A semiconductor rectifier arrangement including a semi-conductor rectifier, a conductor operatively connected to said rectifier and a casing for said rectifier which casing surrounds a portion of said conductor, characterized in that at least at one place along said conductor connected to the rectifier there is arranged a ring member which encloses the conductor, which ring member consists of a material with high initial and maximal permeability with small magnetic field strengths, as well as with small hysteresis losses, and in that a portion of the ring member contactingly surrounds a portion of said casing.

2. Arrangement according to claim 1, characterized in that the portion of the ring member which contactingly surrounds a portion of the casing of the rectifier is structurally united with the casing.

3. Arrangement according to claim 1, characterized in that the ring member consists of a band wound upon itself.

4. Arrangement according to claim 1, characterized in that the material of the ring member consists of an alloy of 75% nickel and 25% iron.

5. A semiconductor rectifier arrangement including a semiconductor rectifier, a conductor operatively connected to said rectifier and a casing for said rectifier which casing surrounds a portion of said conductor, characterized in that at least at one place along said conductor there is arranged an assembly of coaxially stacked and contacting ring elements enclosing said conductor, which ring elements are formed of a material having high initial and maximal permeability with small magnetic field strengths as well as small hysteresis losses, at least one of which ring elements contactingly surrounding a portion of said casing.

No references cited.